United States Patent [19]

Convents et al.

[11] Patent Number: 5,872,093

[45] Date of Patent: Feb. 16, 1999

[54] DETERGENT COMPOSTION

[75] Inventors: Daniel Convents, Merelbeks, Belgium; Rudolf Willem Pieter van Drunen, Maassluis; Jean Hypolites Koek, Schiedam, both of Netherlands

[73] Assignee: Lever Brothers Company, Division of Conopco, Inc., New York, N.Y.

[21] Appl. No.: 766,399

[22] Filed: Dec. 12, 1996

[30] Foreign Application Priority Data

Dec. 16, 1995 [GB] United Kingdom .................... 9525773

[51] Int. Cl.⁶ ........................................ C11D 3/37
[52] U.S. Cl. .................. 510/475; 510/336; 510/337; 510/356; 510/357; 510/359; 510/361; 510/426; 510/431; 510/433; 510/434; 510/447; 510/467; 510/476; 510/499; 510/535; 510/536; 510/537
[58] Field of Search .................... 510/475, 336, 510/337, 356, 357, 359, 361, 426, 431, 433, 434, 447, 467, 476, 499, 535, 536, 537

[56] References Cited

U.S. PATENT DOCUMENTS

| | | | |
|---|---|---|---|
| 5,041,516 | 8/1991 | Frechet et la. | 528/44 |
| 5,418,301 | 5/1995 | Hult et al. | 525/437 |
| 5,530,092 | 6/1996 | Meijer et al. | 528/363 |
| 5,610,268 | 3/1997 | Meijer et al. | 528/363 |

FOREIGN PATENT DOCUMENTS

| | | |
|---|---|---|
| 024367 | 3/1981 | European Pat. Off. . |
| 024368 | 3/1981 | European Pat. Off. . |
| 327927 | 8/1989 | European Pat. Off. . |
| 587550 | 3/1994 | European Pat. Off. . |
| 684044 | 11/1995 | European Pat. Off. . |
| 1368400 | 9/1974 | United Kingdom . |
| 93/14147 | 7/1993 | WIPO . |
| 895/02008 | 1/1995 | WIPO . |

OTHER PUBLICATIONS

European Patent Abstract No. WO096520619A1 which is an abstract of Netherlands Patent Specification No. 0950619 (Aug. 1995).

*Primary Examiner*—Anthony Green
*Attorney, Agent, or Firm*—Neil Y. Gilbert

[57] ABSTRACT

A detergent composition with excellent color care properties. The detergent composition comprises a dendritic macromolecule.

2 Claims, No Drawings

DETERGENT COMPOSTION

TECHNICAL FIELD

The present invention relates to a detergent composition and a process for inhibiting dye transfer between fabrics during washing, in particular the invention relates to detergent compositions containing a macromolecular compound.

BACKGROUND OF THE INVENTION

There is a tendency during the laundering of fabrics for coloured fabrics to release dye into the wash solution. This is a most persistent and troublesome problem as this released dye can then be transferred onto other fabrics. A fabric treatment composition comprising an agent which could prevent the transfer of dye would therefore prove useful.

EP 462 806 (Unilever) discloses a domestic treatment of a fabric with a cationic dye fixing agent to reduce the amount of dye released from the fabric. Suitable cationic dye fixing agents include the dimethyldialkyl ammonium chloride polymer.

GB 1 368 400 (Procter & Gamble) discloses dye-transfer-inhibiting compositions which comprise a peroxygen compound combined with rather complex ketone or aldehyde compounds. Formulations of this type are not very effective.

Other compositions having dye-transfer inhibitory effects are disclosed in EP-A-0 024 367 (Unilever), which discloses the activation of organic peracids with bromide ions and EP-A-0 024 368 (Unilever) which discloses a system comprising an organic peracid precursor and a bromide activator.

The main drawback of these compositions is that they exert a rather strong direct fabric bleaching effect, tending to cause fading of the coloured fabrics.

Surfactant containing dye transfer inhibiting compositions are disclosed in EP-A-0 587 550 (Procter & Gamble). The dye transfer inhibition agent is a polymer selected from polyamine N oxide containing polymers. EP-A-0 327 927 (Procter & Gamble) describes a granular detergent additive comprising water-soluble polymeric compounds based on N-vinylpyrrolidone and/or N-vinylimidazole and/or N-vinyloxazolidine and cationic compounds.

The present invention is based on the discovery that dye transfer can be further prevented by the use of certain macromolecular compounds not previously used in detergent compositions.

DEFINITION OF THE INVENTION

Accordingly the present application relates to a detergent composition comprising a detergent surfactant, a builder and a dendritic macromolecule.

The application also relates to the use of a dendritic macromolecule in the washing of textile fabrics to inhibit dye transfer from one fabric to another fabric.

DETAILED DESCRIPTION OF THE INVENTION

Dentritic macromolecules molecules can be defined as highly branched three dimensional macromolecules with a branch point at each monomer unit formed by reiterative reaction sequences from smaller molecules, referred to as "initiator cores", and other suitable monomers. They are in general described by D. A. Tomalia et al, Angew.Chem. Int.Ed 29 (1990) page 138–175 and in WO 95/02008 (DSM).

Uses that have been suggested for dendritic macromolecules include the calibration of sieves, as catalysts, as selective membranes, for electronic purposes and in coatings.

The preferred dendritic macromolecules which are suitable for inclusion in the detergent compositions of the invention are defined in WO 95/02008 (DSM). They are spherical shaped macromolecules having a diominobutane (DAB) core branching at each nitrogen atom with two ω-amino-propyl groups, which are itself repeatedly branched, depending on the generation number, at each amino group with two ω-amino-propyl groups.

It is preferred if the dentritic macromolecules used in the present invention have a molecular weight of at least 3,000, more preferably of at least 5,000.

It is especially preferred if end groups of the dentritic macromolecules terminate with an amine group.

It is also advantageous if the number of end groups in the dentritic macromolecule is greater than 50. In the context of this invention the term end group means a group that is at the end of a molecular chain furthest away from the core molecule.

The level of dentritic macromolecule in the detergent composition is preferably such that the level of dendritic macromolecule delivered to the wash liquor, when the composition is used at typical dosage levels, will be from 5 mg/l to 50 mg/l, more preferably from 15 mg/l to 35 mg/l.

Thus the dendritic macromolecule may suitably constitute from 0.1 to 10 wt % of the detergent composition, preferably from 0.2 to 5 wt %.

The detergent composition

The novel detergent components of the present invention may be incorporated in detergent compositions of all physical types, for example, powders, liquids, gels and solid bars.

These compositions contain at least one detergent surfactant, will generally contain at least one detergency builder, and may optionally contain bleaching components, enzymes and other active ingredients to enhance performance and properties.

Detergent Surfactants

The detergent compositions of the invention will contain, as essential ingredients, one or more detergent-active compounds (surfactants) which may be chosen from soap and non-soap anionic, nonionic, amphoteric and zwitterionic detergent-active compounds, and mixtures thereof. Many suitable detergent-active compounds are available and are fully described in the literature, for example, in "Surface-Active Agents and Detergents", Volumes I and II, by Schwartz, Perry and Berch.

The choice of detergent-active compound (surfactant), and the amount present, will depend on the intended use of the detergent composition. In fabric washing compositions, different surfactant systems may be chosen, as is well known to the skilled formulator, for handwashing products and for products intended for use in different types of washing machine.

The total amount of surfactant present will also depend on the intended end use and may be as high as 60 wt %, for example, in a composition for washing fabrics by hand. In compositions for machine washing of fabrics, an amount of from 5 to 40 wt % is generally appropriate.

Detergent compositions suitable for use in most automatic fabric washing machines generally contain anionic non-soap surfactant, or nonionic surfactant, or combinations of the two in any ratio, optionally together with soap.

The preferred detergent-active compounds that can be used are soaps and synthetic non-soap anionic and nonionic compounds.

The detergent composition of the invention may comprise both nonionic and anionic surfactant. It is preferred if the ratio of nonionic surfactant to anionic surfactant is at least 1 to 3, more preferably at least 1 to 1.

Anionic surfactants are well-known to those skilled in the art. Examples include alkylbenzene sulphonates, particularly linear alkylbenzene sulphonates having an alkyl chain length of $C_8$–$C_{15}$; primary and secondary alkylsulphates, particularly $C_8$–$C_{15}$ primary alkyl sulphates; alkyl ether sulphates; olefin sulphonates; alkyl xylene sulphonates; dialkyl sulphosuccinates; and fatty acid ester sulphonates. Sodium salts are generally preferred.

However, it is especially preferred if the detergent composition is substantially free of anionic surfactant, in particular linear alkyl benzene sulphonate.

Nonionic surfactants that may be used include the primary and secondary alcohol ethoxylates, especially the $C_8$–$C_{20}$ aliphatic alcohols ethoxylated with an average of from 1 to 20 moles of ethylene oxide per mole of alcohol, and more especially the $C_{10}$–$C_{15}$ primary and secondary aliphatic alcohols ethoxylated with an average of from 1 to 10 moles of ethylene oxide per mole of alcohol. Non-ethoxylated nonionic surfactants include alkylpolyglycosides, glycerol monoethers, and polyhydroxyamides (glucamide).

Detergency Builders

The detergent compositions of the invention will generally also contain one or more detergency builders. The total amount of detergency builder in the compositions will suitably range from 5 to 80 wt %, preferably from 10 to 60 wt %.

Inorganic builders that may be present include sodium carbonate, if desired in combination with a crystallisation seed for calcium carbonate, as disclosed in GB 1 437 950 (Unilever); crystalline and amorphous aluminosilicates, for example, zeolites as disclosed in GB 1 473 201 (Henkel), amorphous aluminosilicates as disclosed in GB 1 473 202 (Henkel) and mixed crystalline/amorphous aluminosilicates as disclosed in GB 1 470 250 (Procter & Gamble); and layered silicates as disclosed in EP 164 514B (Hoechst). Inorganic phosphate builders, for example, sodium orthophosphate, pyrophosphate and tripolyphosphate, may also be present, but on environmental grounds those are no longer preferred.

The detergent compositions of the invention preferably contain an alkali metal, preferably sodium, aluminosilicate builder. Sodium aluminosilicates may generally be incorporated in amounts of from 10 to 70% by weight (anhydrous basis), preferably from 25 to 50 wt %.

The alkali metal aluminosilicate may be either crystalline or amorphous or mixtures thereof, having the general formula:

0.8–1.5 $Na_2O$. $Al_2O_3$. 0.8–6 $SiO_2$

These materials contain some bound water and are required to have a calcium ion exchange capacity of at least 50 mg CaO/g. The preferred sodium aluminosilicates contain 1.5–3.5 $SiO_2$ units (in the formula above). Both the amorphous and the crystalline materials can be prepared readily by reaction between sodium silicate and sodium aluminate, as amply described in the literature.

Suitable crystalline sodium aluminosilicate ion-exchange detergency builders are described, for example, in GB 1 429 143 (Procter & Gamble). The preferred sodium aluminosilicates of this type are the well-known commercially available zeolites A and X, and mixtures thereof.

The zeolite may be the commercially available zeolite 4A now widely used in laundry detergent powders. However, according to a preferred embodiment of the invention, the zeolite builder incorporated in the compositions of the invention is maximum aluminium zeolite P (zeolite MAP) as described and claimed in EP 384 070A (Unilever). Zeolite MAP is defined as an alkali metal aluminosilicate of the zeolite P type having a silicon to aluminium ratio not exceeding 1.33, preferably within the range of from 0.90 to 1.33, and more preferably within the range of from 0.90 to 1.20.

Especially preferred is zeolite MAP having a silicon to aluminium ratio not exceeding 1.07, more preferably about 1.00. The calcium binding capacity of zeolite MAP is generally at least 150 mg CaO per g of anhydrous material.

Organic builders that may be present include polycarboxylate polymers such as polyacrylates, acrylic/maleic copolymers, and acrylic phosphinates; monomeric polycarboxylates such as citrates, gluconates, oxydisuccinates, glycerol mono-, di- and trisuccinates, carboxymethyloxysuccinates, carboxymethyloxymalonates, dipicolinates, hydroxyethyliminodiacetates, alkyl- and alkenylmalonates and succinates; and sulphonated fatty acid salts. This list is not intended to be exhaustive.

Especially preferred organic builders are citrates, suitably used in amounts of from 5 to 30 wt %, preferably from 10 to 25 wt %; and acrylic polymers, more especially acrylic/maleic copolymers, suitably used in amounts of from 0.5 to 15 wt %, preferably from 1 to 10 wt %.

Builders, both inorganic and organic, are preferably present in alkali metal salt, especially sodium salt, form.

The Enzyme

Suitable enzymes include the proteases, amylases, cellulases and lipases usable for incorporation in detergent compositions.

Preferred proteolytic enzymes (proteases) are normally solid, catalytically active protein materials which degrade or alter protein types of stains when present as in fabric stains in a hydrolysis reaction. They may be of any suitable origin, such as vegetable, animal, bacterial or yeast origin.

Proteolytic enzymes or proteases of various qualities and origins and having activity in various pH ranges of from 4–12 are available and can be used in the instant invention. Examples of suitable proteolytic enzymes are the subtilisins, which are obtained from particular strains of *B. subtilis* and *B. licheniformis,* such as the commercially available subtilisins Maxatase (Trade Mark), as supplied by Gist-Brocades N.V., Delft, Holland, and Alcalase (Trade Mark), as supplied by Novo Industri A/S, Copenhagen, Denmark.

Particularly suitable is a protease obtained from a strain of Bacillus having maximum activity throughout the pH range of 8–12, being commercially available, e.g. from Novo Industri A/S under the registered trade-names Esperase (Trade Mark) and Savinase (Trade-Mark). The preparation of these and analogous enzymes is described in GB 1 243 785. Other commercial proteases are Kazusase (Trade Mark) (obtainable from Showa-Denko of Japan), Optimase (Trade Mark) (from Miles Kali-Chemie, Hannover, West Germany), and Superase (Trade Mark) (obtainable from Pfizer of U.S.A.).

Detergency enzymes are commonly employed in granular form in amounts of from about 0.1 to about 3.0 wt %.

Bleach Components

Detergent compositions according to the invention may also contain a bleach system, although non-bleaching compositions are preferred.

Fabric washing compositions may desirably contain peroxy bleach compounds, for example, inorganic persalts or organic peroxyacids, capable of yielding hydrogen peroxide in aqueous solution. Suitable peroxy bleach compounds include organic peroxides such as urea peroxide, and inorganic persalts such as the alkali metal perborates, percarbonates, perphosphates, persilicates and persulphates. Preferred inorganic persalts are sodium perborate monohydrate and tetrahydrate, and sodium percarbonate.

Especially preferred is sodium percarbonate having a protective coating against destabilisation by moisture. Sodium percarbonate having a protective coating comprising sodium metaborate and sodium silicate is disclosed in GB 2 123 044B (Kao).

The peroxy bleach compound is suitably present in an amount of from 5 to 35 wt %, preferably from 10 to 25 wt %.

The peroxy bleach compound may be used in conjunction with a bleach activator (bleach precursor) to improve bleaching action at low wash temperatures. The bleach precursor is suitably present in an amount of from 1 to 8 wt %, preferably from 2 to 5 wt %.

Preferred bleach precursors are peroxycarboxylic acid precursors, more especially peracetic acid precursors and peroxybenzoic acid precursors; and peroxycarbonic acid precursors. An especially preferred bleach precursor suitable for use in the present invention is N,N,N',N'-tetracetyl ethylenediamine (TAED).

A bleach stabiliser (heavy metal sequestrant) may also be present. Suitable bleach stabilisers include ethylenediamine tetraacetate (EDTA) and the polyphosphonates such as Dequest (Trade Mark).

Other ingredients

The compositions of the invention may contain alkali metal, preferably sodium, carbonate, in order to increase detergency and ease processing. Sodium carbonate may suitably be present in amounts ranging from 1 to 60 wt %, preferably from 2 to 40 wt %. However, compositions containing little or no sodium carbonate are also within the scope of the invention.

Powder flow may be improved by the incorporation of a small amount of a powder structurant, for example, a fatty acid (or fatty acid soap), a sugar, an acrylate or acrylate/maleate polymer, or sodium silicate.

One preferred powder structurant is fatty acid soap, suitably present in an amount of from 1 to 5 wt %.

Other materials that may be present in detergent compositions of the invention include sodium silicate; antiredeposition agents such as cellulosic polymers; inorganic salts such as sodium sulphate; lather control agents or lather boosters as appropriate; proteolytic and lipolytic enzymes; dyes; coloured speckles; perfumes; foam controllers; and fabric softening compounds. This list is not intended to be exhaustive.

Detergent compositions of the invention may be prepared by any suitable method.

Particulate detergent compositions are suitably prepared by spray-drying a slurry of compatible heat-insensitive ingredients, and then spraying on or postdosing those ingredients unsuitable for processing via the slurry.

The skilled detergent formulator will have no difficulty in deciding which ingredients should be included in the slurry and which should not.

Particulate detergent compositions of the invention preferably have a bulk density of at least 400 g/l, more preferably at least 500 g/l.

Especially preferred compositions have bulk densities of at least 650 g/liter, more preferably at least 700 g/liter.

Such powders may be prepared either by post-tower densification of spray-dried powder, or by wholly non-tower methods such as dry mixing and granulation; in both cases a high-speed mixer/granulator may advantageously be used.

Processes using high-speed mixer/granulators are disclosed, for example, in EP 340 013A, EP 367 339A, EP 390 251A and EP 420 317A (Unilever).

Liquid detergent compositions can be prepared by admixing the essential and optional ingredients thereof in any desired order to provide compositions containing components in the requisite concentrations. Liquid compositions according to the present invention can also be in compact form which means it will contain a lower level of water compared to a conventional liquid detergent.

EXAMPLES

The invention will now be illustrated by the following non-limiting examples. In the examples all percentages are expressed by weight.

Comparative Examples are designated by letters, while Examples of the invention are designated by numbers.
Preparation of the deterrent compositions Examples were prepared according to standard procedures for that product type.

Examples 1 and A are powders prepared by a non-tower route. Examples 2, 3, B and C are liquids. Examples 4 and D are powders prepared by spray drying.

The dendritic macromolecule used in Examples 1 to 4 was DAB(PA)64 ex DSM, a dendrimer based on a diaminobutane (DAB) initiator core and having a theoretical molecular weight of 7166 and 64 amine end groups.

TABLE 1

|  | EXAMPLE | | | | | | | |
|---|---|---|---|---|---|---|---|---|
|  | A | 1 | B | 2 | C | 3 | D | 4 |
| Na Primary alkylsulphate | 9 | 9 | — | — | — | — | — | — |
| Alkyl polyglycoside 600 | — | — | — | — | 12 | 12 | — | — |
| Alcohol ethoxylate 7EO | 20 | 20 | — | — | 12 | 12 | — | — |
| Na linear alkyl benzene-sulphonate | — | — | 8 | 8 | — | — | 24 | 24 |
| Alcohol ethoxylate 9EO | — | 8 | 8 | — | — | — | — | — |
| Na alcohol EO sulphate | — | — | 14 | 14 | — | — | — | — |
| Alcohol ethoxylate 3EO | — | — | — | — | 16 | 16 | — | — |
| Soap | 3 | 3 | — | — | — | — | — | — |
| Zeolite A24 | 55 | 55 | — | — | — | — | — | — |
| Na tri polyphosphate | — | — | — | — | — | — | 15 | 15 |
| Soda ash | 2 | 2 | — | — | — | — | 17 | 17 |
| Silicate | — | — | — | — | — | — | 8 | 8 |
| Na carboxymethyl cellulose | 2 | 2 | — | — | — | — | — | — |
| Sodium citrate | — | — | 5 | 5 | — | — | — | — |
| Propylene Glycol | — | — | 4 | 4 | — | — | — | — |
| Sorbitol | — | — | 5 | 5 | — | — | — | — |
| Tetraborate | — | — | 3 | 3 | — | — | — | — |
| Citrate 2 aq | — | — | — | — | 15 | 15 | — | — |
| Glycerol | — | — | 3 | 3 | 5 | 5 | — | — |
| Borax 10 aq | — | — | — | — | 4 | 4 | — | — |
| Na sulphate | — | — | — | — | — | — | 29 | 29 |
| DAB (PA) 64* | — | 0.8 | — | 1.5 | — | 0.5 | — | 1 |
| Water and minors | up to 100% | | | | | | | |

The compositions were added to warm water such that 25 mg/L of dendrimer was present in the wash solution. To 25 ml of this wash solution a coloured cotton swatch (coloured with a dye listed below) was added together with a white cotton swatch. The fabrics were agitated in the wash solution for 30 minutes. The fabrics were tumble dried and the reflectance spectra were measured using a Minolta spectrometer.

The data thereby obtained was transferred to the standard CIELAB L*a*b* color space parameters. In this colour space, L* indicates lightness and a* and b* are the chromaticity coordinates.

The colour differences between the control swatch, without addition of the dendritic polymer, and the swatch washed in the presence of the polymer was expressed as ΔE, calculated from the following equation:

$$(\Delta E) = \sqrt{(\Delta L)^2 + (\Delta a)^2 + (\Delta b)^2}$$

The whiteness difference (ΔL), and the colour difference (ΔE), between the Examples of the invention and the corresponding comparative Examples, obtained by the above method, are given in Table 2.

TABLE 2

|  | Reactive Black 5 | | Direct Green 26 | | Direct Red 80 | |
| --- | --- | --- | --- | --- | --- | --- |
| Dye | ΔL | ΔE | ΔL | ΔE | ΔL | ΔE |
| Example 1-A | 7.6 | 8.1 | 0.7 | 1.2 | 1.0 | 1.7 |
| Example 2-B | 1.6 | 2.0 | 0.3 | 1.1 | 0.4 | 1.8 |
| Example 3-C | 2.8 | 3.0 | 1.5 | 2.1 | 2.2 | 4.0 |
| Example 4-D | 1.0 | 1.1 | — | — | — | — |

Table 2 demonstrates that less colour is transferred from fabric to fabric when a formulation is used containing a dendritic macromolecule.

We claim:

1. A detergent composition comprising:
   an anionic detergent surfactant in an amount of 5 to 40 wt. % selected from the group consisting of linear alkylbenzene sulphonates having an alkyl chain length of $C_8$–$C_{15}$, primary and secondary alkylsulphates, alkylether sulphates, olefin sulphonates, alkyl xylene sulphonates, dialkyl sulphosuccinates and fatty acid ester sulphonates;
   a builder in an amount of 5 to 80 wt. % selected from the group consisting of sodium carbonate, a zeolite, an amorphous aluminosilicate, a mixed crystalline/amorphous aluminosilicate, a layered silicate, sodium orthophosphate, sodium pyrophosphate, sodium tripolyphosphate, a polyacrylate, an acrylic/maleic copolymer, an acrylic phosphinate and a monomeric polycarboxylate; and
   a dendritic macromolecule in an amount of about 0.1 to about 10 wt. % of the detergent composition, said dendritic macromolecule being spherical in shape and having a diaminobutane core branching at each nitrogen atom with two ω-amino-propyl groups, which are in turn branched a number of times necessary to have a molecular weight of about 3,000 to about 7166.

2. A detergent composition comprising:
   a nonionic detergent surfactant in an amount of 5 to 40 wt. % selected from the group consisting of a $C_8$–$C_{20}$ aliphatic primary and secondary alcohol ethoxylated with an average of from 1 to 20 moles of ethylene oxide per mole of alcohol, an alkylpolyglycoside, a glycerol monoether and a glucamide;
   a builder in an amount of 5 to 80 wt. % selected from the group consisting of sodium carbonate, a zeolite, an amorphous aluminosilicate, a mixed crystalline/amorphous aluminosilicate, a layered silicate, sodium orthophosphate, sodium pyrophosphate, sodium tripolyphosphate, a polyacrylate, an acrylic/maleic copolymer, an acrylic phosphinate and a monomeric polycarboxylate; and
   a dendritic macromolecule in an amount of about 0.1 to about 10 wt. % of the detergent composition, said dendritic macromolecule being spherical in shape and having a diaminobutane core branching at each nitrogen atom with two ω-amino-propyl groups, which are in turn branched a number of times necessary to have a molecular weight of about 3,000 to about 7,166.

* * * * *